July 20, 1948. A. L. GE WERTZ 2,445,481
CABLE HANGER
Filed Dec. 20, 1943
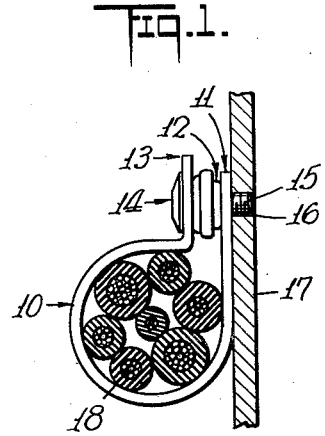
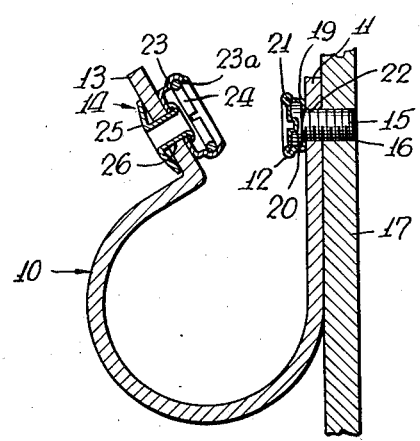
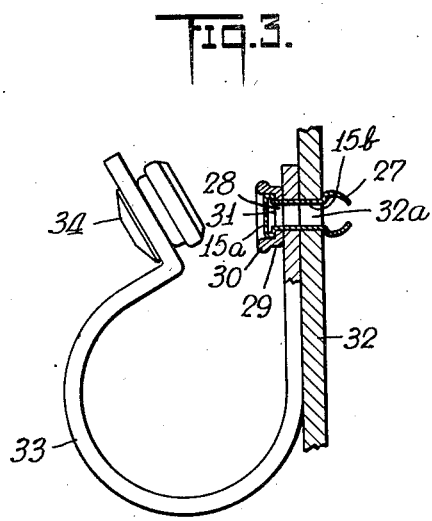
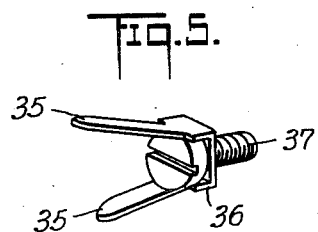
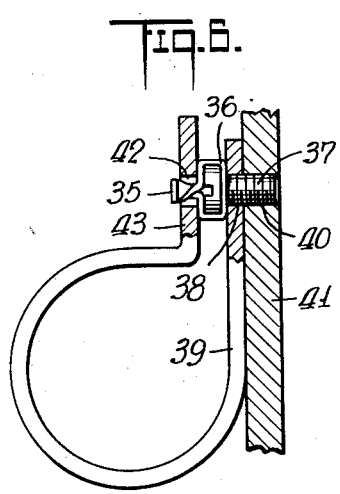
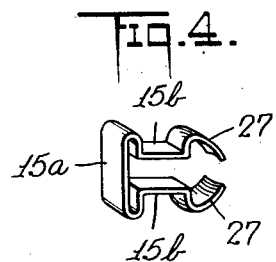
INVENTOR
*Arthur Lawrence Ge Wertz*
BY
*Harry Ernest Rubens*
ATTORNEY Patented July 20, 1948

2,445,481

UNITED STATES PATENT OFFICE 2,445,481

CABLE HANGER

Arthur Lawrence Ge Wertz, Mount Vernon, N. Y., assignor to Burndy Engineering Company, Inc., a corporation of New York Application December 20, 1943, Serial No. 514,902

1 Claim. (Cl. 248—74)

My invention relates to cable hangers for supporting the wiring of an electrical system.

Such devices are used in aircraft where the bundle of wires have been inserted into the cable hanger and the hanger more or less permanently mounted to the supporting structure.

On occasion it has been found necessary to add new wires to the system due to subsequent modifications, and the permanent installation of the cable hanger has been a problem.

The principal object of my invention is to provide a cable hanger that can be securely and permanently mounted to a supporting structure, but which can be quickly opened for changes in the wiring system or repairs thereto. Other objects are to provide a hanger of the foregoing character in which the hanger may be snapped into an aperture of the supporting structure for mounting thereto; to provide snap acting means to facilitate opening and closing thereof; and to provide devices employing the aforesaid advantages in an inexpensive structure adapted to mass production; preferably non-metallic in character.

I accomplish these and other objects and obtain my new results as will be apparent from the device described in the following specification, particularly pointed out in the claim, and illustrated in the accompanying drawing in which:

Fig. 1 is a side elevation of my cable hanger, attached to a supporting wall structure.

Fig. 2 is sectional view of the same in open position.

Fig. 3 is a side elevation illustrating a modified form of securing means.

Fig. 4 is a perspective view of the securing means shown in Fig. 3.

Fig. 5 is a perspective view of a further modification of securing and closure means.

Fig. 6 is a side elevation of the cable hanger illustrating the same in position.

Referring more particularly to Fig. 1, reference numeral 10 designates a curved strip of flexible, preferably non-metallic material such as sheet fiber or Vinylite which resiliently opens, but does not flatten out when carrying a weight therein, having attached to one end 11, thereof a stud fastener 12, and to the other end 13, a socket fastener 14. Extending from the stud fastener 12 is a threaded shank portion 15, in engagement with the threaded aperture 16 of the supporting wall structure 17. Cables 18, constituting an electrical harness are mounted within the hanger.

In Figure 2, the stud fastener part 12 comprises the sheet metal covering 19 tightly drawing over the slotted bead 20 of the shank 15, and provided with a circumferential bead 21.

The shank 15 passes through an aperture 22 in the hanger strip 10, thus securing the strip to the supporting wall.

The socket fastener 14 comprises a housing 23, carrying within it, a slotted circular spring 24, with a tubular rivet 25 passing through an aperture 26 in the remaining end of the hanger strip 10, and securing the housing to the hanger strip. When the socket fastener 14 is locked to the stud fastener 12, the circular spring 24 is snapped over the circumferential bead 21, the two parts are locked together. Similarly when the end 13 of the strip 10, is pulled away from its associated end 11, the spring 24 is curved over the circumferential bead 21, and detached therefrom. By indenting the housing 23, as at 23a, the device can only be opened by lifting the end 13.

In Fig. 4, I show a U-shaped spring clip having a head section 15a paralleled sides 15b, and compressible hook-shaped locking ends 27, which may be inserted into the central aperture 28 of a modified stud fastener 29 (see Fig. 3), having a circumferential bead 30, and supporting shoulder 31 for carrying the head section 15a of the spring clip, and enter aperture 32a of the supporting wall 32 for securement thereto.

The cable hanger 33 is similar to the one illustrated in Fig. 2, with a similar socket fastener 34 for attachment to the stud fastener 29.

Another variant is shown in Fig. 5, which consists of a flexible strip of sheet metal having a pair of spreading ends 35 and a central apertured body section 36. A slotted machine screw 37 is inserted therein, and passes through the apertured end 38 of a cable hanger 39 and engages a threaded aperture 40 of the supporting wall 41. The spreading ends are twisted and forced through aperture 42 of the remaining cable hanger end 43, after which it is spread apart to hold the cable ends together.

While I have shown snap acting closing means cooperating with the hanger attaching means at the end of the flexible strip, a distinct advantage with the semi-rigid yet flexible Vinylite strip, the hanger attaching means may be incorporated at some intermediate point on the strip, if no objection is made to the tendency of the cable hanger to open, or to the necessity of furnishing separate attaching means.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claim, and by means of which, objects of my invention are attained and new results accomplished, as it is obvious that the particular embodiments herein shown and described are only some of the many that can be employed to attain these objects and accomplish these results.

I claim:

A hanger for supporting wiring or the like to a supporting structure, said hanger comprising a band of non-metallic material having a free end and a supported end, said supported end having a stud member for attaching the supported end to a supporting structure, said stud member being provided with a head; a socket attached to the free end of the band for engaging the head of the stud and being assembled and retained in position independently of any resiliency in the band, for locking the free end of the plastic band to the stud member for forming a closed loop.

ARTHUR LAWRENCE GE WERTZ.

REFERENCES CITED

The following references are of record in the file of this patent:

UNITED STATES PATENTS

| Number | Name | Date |
|---|---|---|
| 1,246,325 | Rohmer | Nov. 13, 1917 |
| 1,535,982 | Carr | Apr. 28, 1925 |
| 1,656,036 | Carr | Jan. 10, 1928 |
| 2,061,463 | Hall | Nov. 17, 1936 |
| 2,338,006 | Morehouse | Dec. 28, 1943 |
| 2,338,754 | Bonas | Jan. 11, 1944 |
| 2,340,560 | Rempt | Feb. 1, 1944 |
| 2,340,712 | Tinnerman | Feb. 1, 1944 |
| 2,373,833 | Johnson | Apr. 17, 1945 |